(12) United States Patent
Arnold et al.

(10) Patent No.: US 6,896,720 B1
(45) Date of Patent: May 24, 2005

(54) CLEANING APPARATUS

(76) Inventors: Adrian Christopher Arnold, Shortacre, Brentor, Tavistock, Devon (GB), PL19 0NG; Arthur John Arnold, Raventor, Lydford, Devon (GB), LX20 4BJ ( * ) Notice: Subject to any disclaimer, the term of this patent is extended or adjusted under 35 U.S.C. 154(b) by 53 days.

(21) Appl. No.: 09/637,144

(22) Filed: Aug. 11, 2000

Related U.S. Application Data

(63) Continuation of application No. PCT/GB99/00507, filed on Feb. 18, 1999, now abandoned.

(51) Int. Cl.[7] .............................................. B01D 45/12
(52) U.S. Cl. ............................ 95/271; 55/394; 55/418; 55/419; 55/447; 55/459.1; 55/459.5; 55/461; 55/DIG. 14
(58) Field of Search ..................... 55/319, 344, 345, 55/346, 347, 348, 349, 394, 399, 418, 429, 447, 457, 458, 459.1, 459.5, 461, DIG. 14, 419; 95/269, 271, 272

(56) References Cited

U.S. PATENT DOCUMENTS

| | | | | |
|---|---|---|---|---|
| 535,099 A | * | 5/1895 | Gale et al. ..................... | 55/461 |
| 2,290,664 A | * | 7/1942 | Allardice .................. | 55/459.5 |
| 3,513,642 A | * | 5/1970 | Cornett ......................... | 55/399 |
| 3,870,489 A | * | 3/1975 | Shaddock .................... | 55/319 |
| 4,210,430 A | * | 7/1980 | Galow et al. ................ | 55/344 |
| 4,328,008 A | | 5/1982 | Muenger et al. | |
| 4,375,365 A | * | 3/1983 | Müller et al. ................. | 55/346 |
| 4,585,466 A | * | 4/1986 | Syred et al. .................. | 55/349 |
| 4,664,887 A | * | 5/1987 | Engström .................... | 55/345 |
| 4,702,846 A | * | 10/1987 | Ryynänen .................... | 55/349 |
| 4,872,892 A | * | 10/1989 | Vartiainen et al. ........... | 55/345 |
| 4,969,934 A | * | 11/1990 | Kusik .......................... | 95/271 |
| 5,221,299 A | | 6/1993 | Boring | |
| 5,496,394 A | * | 3/1996 | Nied .......................... | 95/271 |

FOREIGN PATENT DOCUMENTS

| | | |
|---|---|---|
| DE | 3309519 | 9/1984 |
| GB | 2136326 | 9/1984 |

OTHER PUBLICATIONS pp. 190–199, W. Strauss, Industrial Gas Cleaning, Pergamon Press, Ltd., London, England, First Edition, 1966.

* cited by examiner

*Primary Examiner*—Duane Smith
*Assistant Examiner*—Jason M. Greene
(74) *Attorney, Agent, or Firm*—Nath & Associates; Harold L. Novick

(57) ABSTRACT

Apparatus for separating particulate matter from an airstream includes a housing including an intake for particulates-containing air and an exhaust for cleaned air, in which the apparatus includes a primary vortex generator in the intake air and the housing includes a separation zone which includes primary and secondary separation chambers each associated with respective particulates collector and including an interconnector adapted to generate a secondary vortex in the secondary separation chamber.

20 Claims, 5 Drawing Sheets

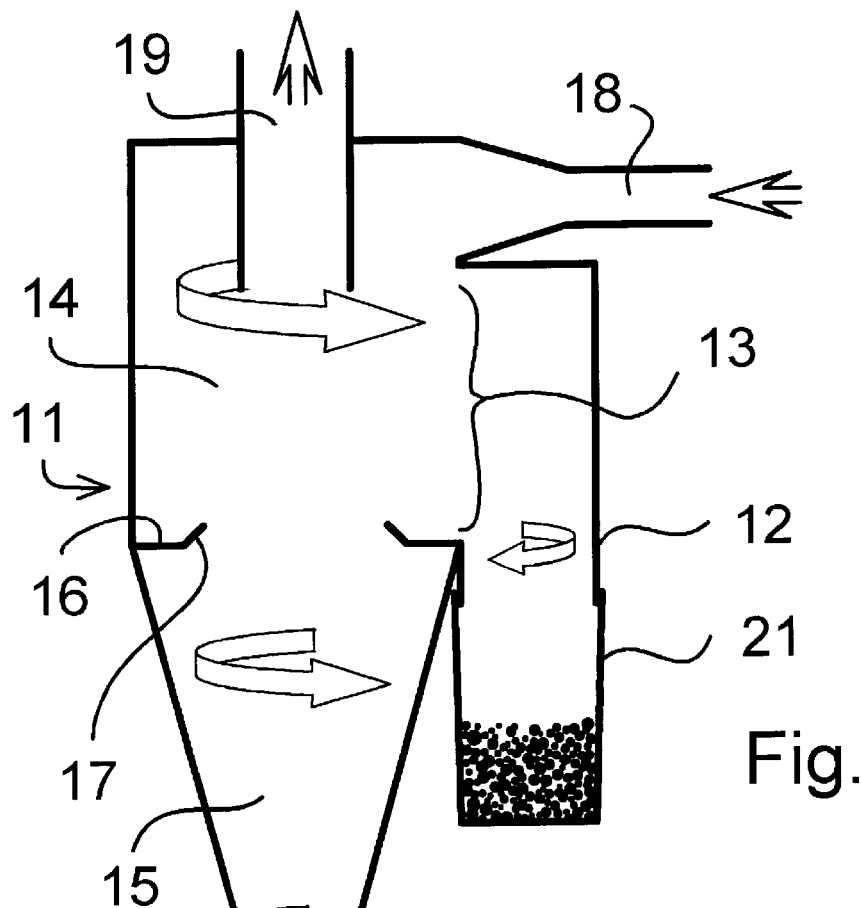
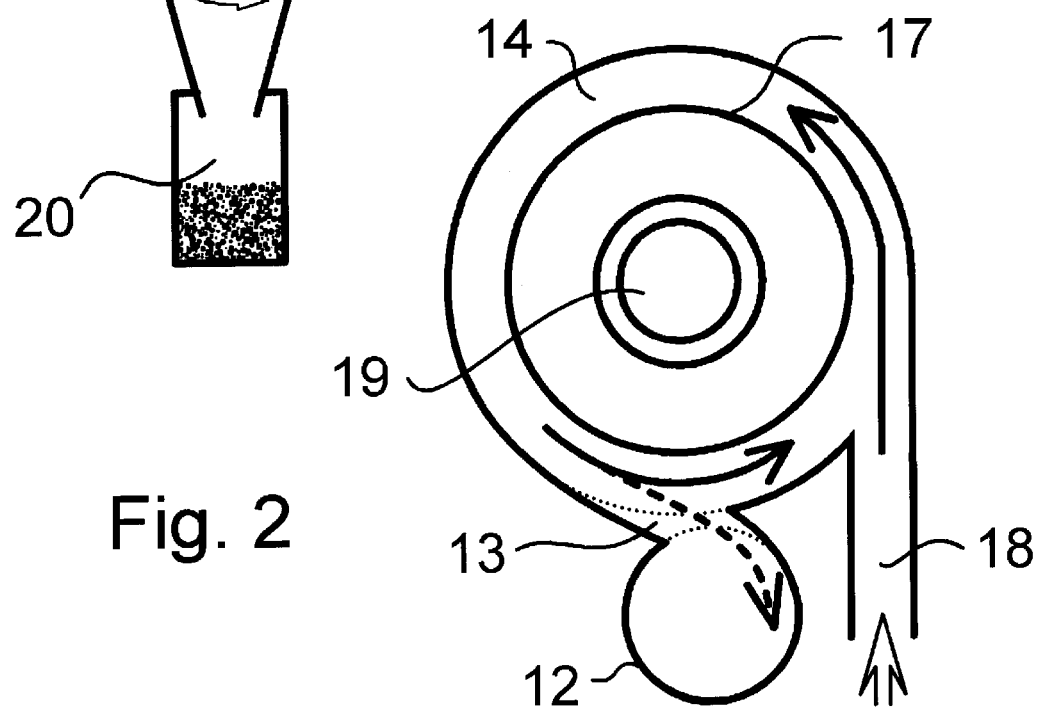
Fig. 1
Fig. 2

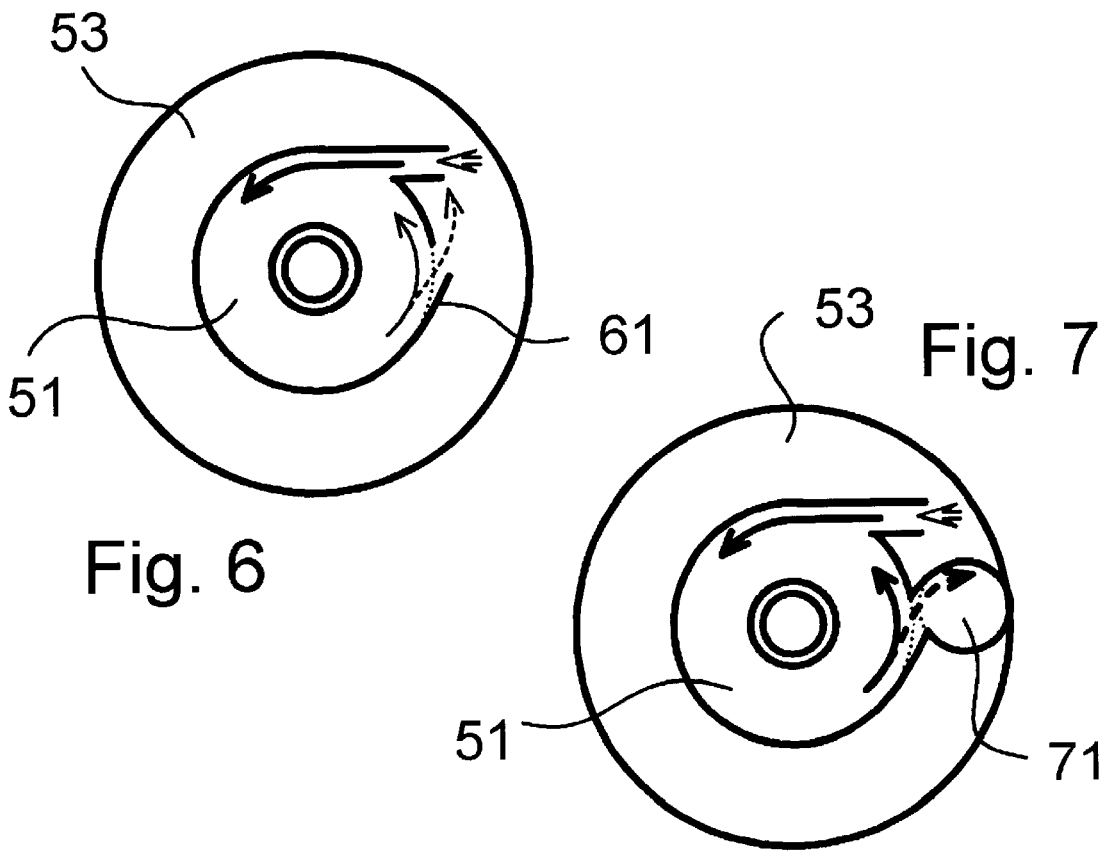
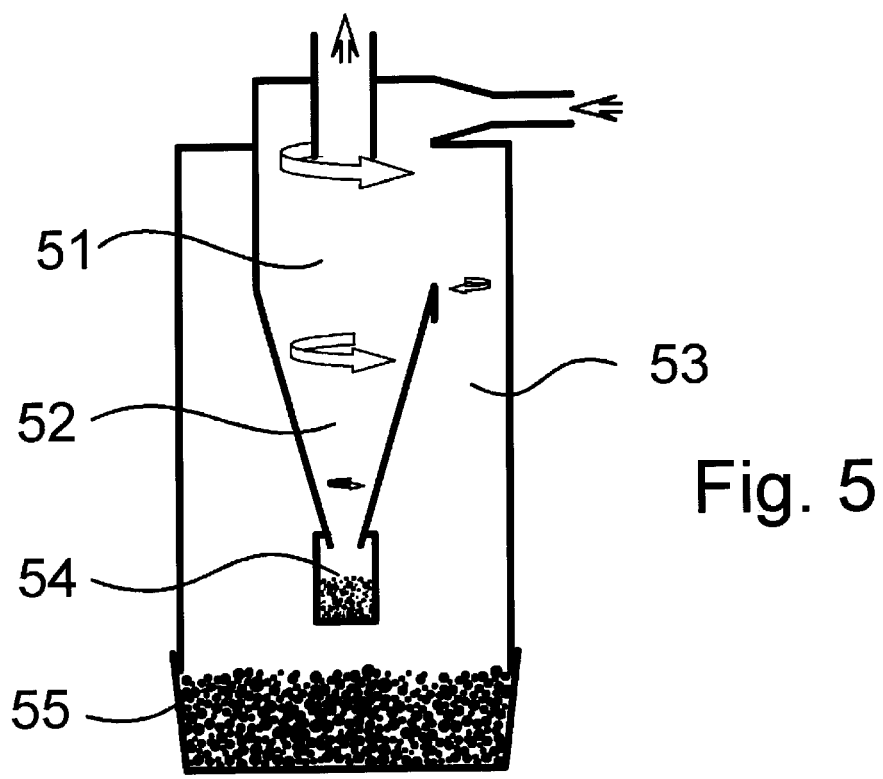

CLEANING APPARATUS

This is a continuation of International Application No. PCT/GB99/00507, having a filing date of Feb. 18, 1999, now abandoned, which is a continuation of Great Britain application no. GB9803539.7, having a filing date of Feb. 19, 1998, now abandoned.

TECHNICAL FIELD

This invention relates to a cleaning apparatus of the type for separating particulate matter from a fluid stream such as an airstream, which are used, for example, in so-called bagless vacuum cleaners.

BACKGROUND OF THE INVENTION

Patent Cooperation Treaty Publication WO 96/11047 describes apparatus for the removal of particulate material suspended in a gas stream, in which rotary motion is generated in the stream which is then passed to an expansion chamber where the gases are decelerated to enable particulates to fall out of suspension and to be collected in a collection chamber. It has been found that, whereas such apparatus deals effectively with large and medium-sized particles, small particles tend to remain entrained in the gas stream and are exhausted to the atmosphere. Clearly, where the apparatus is incorporated in a suction cleaner for indoor use, the result is that the small particulate matter tends to be recycled in the room being cleaned and, having left the apparatus in the exhaust stream, it eventually settles as dust on the furniture or the floor.

SUMMARY OF THE INVENTION

According to one aspect of the invention, there is provided apparatus for separating particulate matter from a fluid stream, the apparatus comprising a housing including means for intake of particulate-containing fluid and means for exhaust of cleaned fluid. The apparatus further includes means for generating a primary vortex in the intake fluid and the housing comprises a separation zone that includes primary and secondary separation chambers each associated with respective particulate collection means and including interconnection means adapted to generate a secondary vortex in the secondary separation chamber.

Preferably, the fluid is air although a liquid stream could be cleared of particulates in the inventive apparatus. For convenience, the term "airstream" will be used throughout the remainder of this specification and is intended to include other fluids, such as, for example, liquids.

In operation, heavier particulates pass through the interconnection means from the primary to the secondary chamber and are separated from the airstream therein, whereas lighter particulates are retained within the primary chamber. The primary chamber and secondary chambers are preferably peripherally interconnected and the primary chamber preferably includes a parallel-sided or cylindrical portion and a cyclone portion. The cylindrical portion accommodates the interconnection means and may be disposed relatively upstream of and co-axial with the cyclone portion, which is preferably tapered inwardly in the downstream direction. The secondary chamber is preferably cylindrical and peripherally connected to the primary chamber in the parallel-sided portion, whereby the respective axes of the primary and secondary chambers are parallel. Dirt-laden air entering the separation zone of the primary chamber is constrained to follow a spiral pathway around and progressively along the axis thereof, optionally under the influence of vanes or other deflection means disposed internally of the primary chamber on the roof or wall thereof. Particulate material entrained therein is forced under the influence of centripetal force towards the wall of the chamber, the larger and denser particles, being more influenced by centripetal force than the smaller and less dense particles, are urged to follow the wall more closely. As the denser material moves around the periphery of the primary chamber, it reaches the intercommunicating connection with the secondary chamber and is urged to enter therein by centripetal force. The secondary vortex created therein, preferably in the opposite rotary sense to the primary vortex, maintains the particles in suspension and carries them to a collection chamber from where they may be removed from time to time. An inwardly-extending annular flange may be provided between the cylindrical and cyclone portions to improve discrimination between heavier and lighter particulates. Optionally, a tertiary or further separation chamber is interconnected with the secondary chamber and provides a corresponding vortex therein.

The lighter material remaining in suspension in the primary chamber is moved spirally to the tapered cyclone portion thereof where it becomes progressively accelerated as the diameter reduces. On reaching the narrowest part, it is ejected from the airstream which then passes, substantially clear of particulate matter, to the exhaust means. The fact that the air in the cyclone part of the apparatus has had the denser particles already removed therefrom results in a lower weight loading of the airstream. With the reduced weight loading, the airstream attains greater velocities. This, in turn, results in more effective removal of smaller particles than would be expected with a cyclone alone, without the secondary chamber, and the apparatus as a whole thereby has an enhanced ability to handle a wider range of material with greater efficiency and at higher loading rates.

The interconnection means may be adapted to generate a secondary vortex in the secondary chamber by means of airstream current-deflecting elements in the region of the interconnection between the chambers. Preferably, the current-deflecting elements establish a zone of spatial separation between the respective vortices whereby the vortices do not create or at least minimize any turbulence between them while still allowing particulate matter adjacent the wall of the primary chamber to pass unimpeded into the secondary chamber. The current-deflecting elements may comprise a chamber wall portion on at least one side of the intercommunication aperture that is deformed to increase its radius of curvature towards a tangential position. Preferably, the primary chamber wall on the upstream side of the aperture is so deformed. Even more preferably both the primary and secondary chamber walls on each side of the aperture are so deformed so as to provide an interconnecting neck that is generally chordal to both chambers. In these configurations, the deformed wall of the primary chamber urges the heavier particles to move outwardly of the radius of curvature of the primary chamber. Also, the deformed wall of the secondary chamber acts to separate the primary airstream to create a secondary vortex in the secondary chamber and preferably in the opposite direction to that of the primary vortex.

In the separation zone, the primary separation chamber may contain a cyclone separator, whereby the outer wall of the primary chamber and the wall of the cyclone separator define an annular chamber in peripheral communication with the secondary chamber. The cyclone separator may be arranged for either upward or downward swirling or helical motion of the airstream, with the particulate load thereof being either discharged upwardly so that it settles under gravity in a collection chamber formed about the upper portion of the cyclone separator, or discharged downwardly into a collection vessel disposed below the cyclone separator.

The means for generating a primary vortex in the particulate-containing airstream entering the housing may comprise an array of vanes upstream of the housing, individual vanes being optionally spaced apart axially to prevent clogging by large particulates or filamentary material, or an off-center, for example, tangential, inlet pipe. An auxiliary air intake may provide a laminar film or layer of dirt-free air at the periphery of the primary chamber across or at least into the interconnection means, to improve retention of lighter particulates in the primary chamber while not substantially impeding transfer of heavier particulates to the secondary chamber. The auxiliary air intake may have an entry orifice in the primary chamber immediately adjacent to or spaced apart from the intake means for particulates-containing air and the auxiliary airstream may be induced by the flow of particulates-containing air across the entry orifice or may be supplied under positive external pressure, for example by an auxiliary pump.

The primary separation chamber may comprise two or more cylindrical portions each with an associated secondary separation chamber, adjacent cylindrical portions being axially connected together by cyclone portions of progressively smaller diameter in the downstream direction.

DESCRIPTION OF THE FIGURES

Embodiments of the invention will now be described by way of example with reference to the accompanying schematic drawings, of which:

FIG. 1 is a side view of one embodiment of a separation apparatus;

FIG. 2 is a plan view showing the internal parts of the apparatus of FIG. 1;

FIG. 5 is a side view of a further alternative embodiment in which the primary chamber is contained within a larger chamber;

FIG. 6 shows in plan view a variation of FIG. 5 where the larger chamber constitutes the secondary chamber;

FIG. 7 shows in plan view another embodiment of FIG. 5 where the larger chamber contains the secondary chamber;

DETAILED DESCRIPTION OF THE INVENTION

Figure 3:
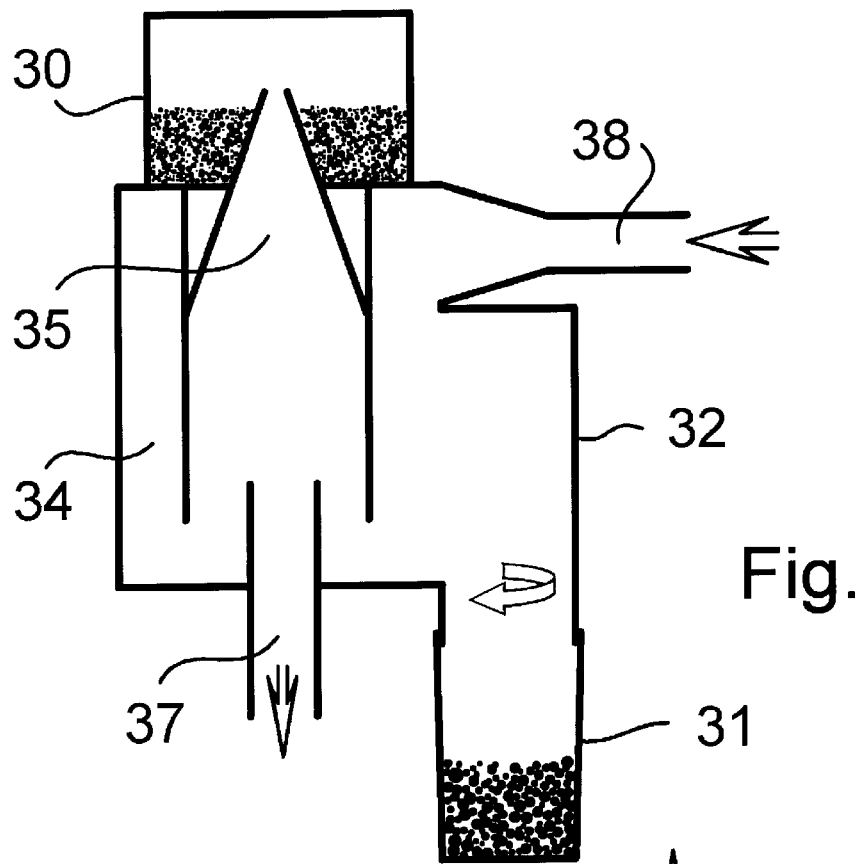
FIG. 3 is a side view of another embodiment of separation apparatus.

Referring to FIGS. 1 and 2, the apparatus consists of a primary chamber 11 and a secondary chamber 12 joined by a generally chordal interconnection neck 13, the walls of which are constituted by respective wall portions of the primary and secondary chamber being tangentially deformed and joined to the other chamber. The primary chamber 11 has an upper cylindrical portion 14 and a lower co-axial cyclone separator 15. An inner flange 16 is disposed between the upper and lower parts; the flange has an upwardly-turned inner peripheral lip 17. The flange 16 is not essential.

A tangential inlet 18 is provided at the upper end and also an axial outlet 19 for exhaust air; an electric motor (not shown) draws air through the apparatus, or alternatively may blow air through under positive pressure.

Removable collection vessels 20, 21 are provided to the cyclone separator and secondary separation chamber respectively. As shown by the arrows, inlet air is constrained by the outlet 19 to follow a helical anticlockwise pathway around the inner wall of the cylinder portion of the primary chamber, heavier particulates, represented by the dotted arrow of FIG. 2, being carried through the neck 13 into the secondary chamber, where they follow a helical clockwise pathway. The heavier particles eventually fall by gravity into collection vessel 21; the lighter particles remain entrained in the primary chamber and are separated from the airstream in the cyclone separator, being collected in collection vessel 20. The neck 13 not only provides an access pathway for heavier particulates but also provides a demarcation region between the respective vortices, to minimize generation of turbulence. The flange 16 assists in ensuring that heavier particulates enter the secondary chamber.

Figure 4:
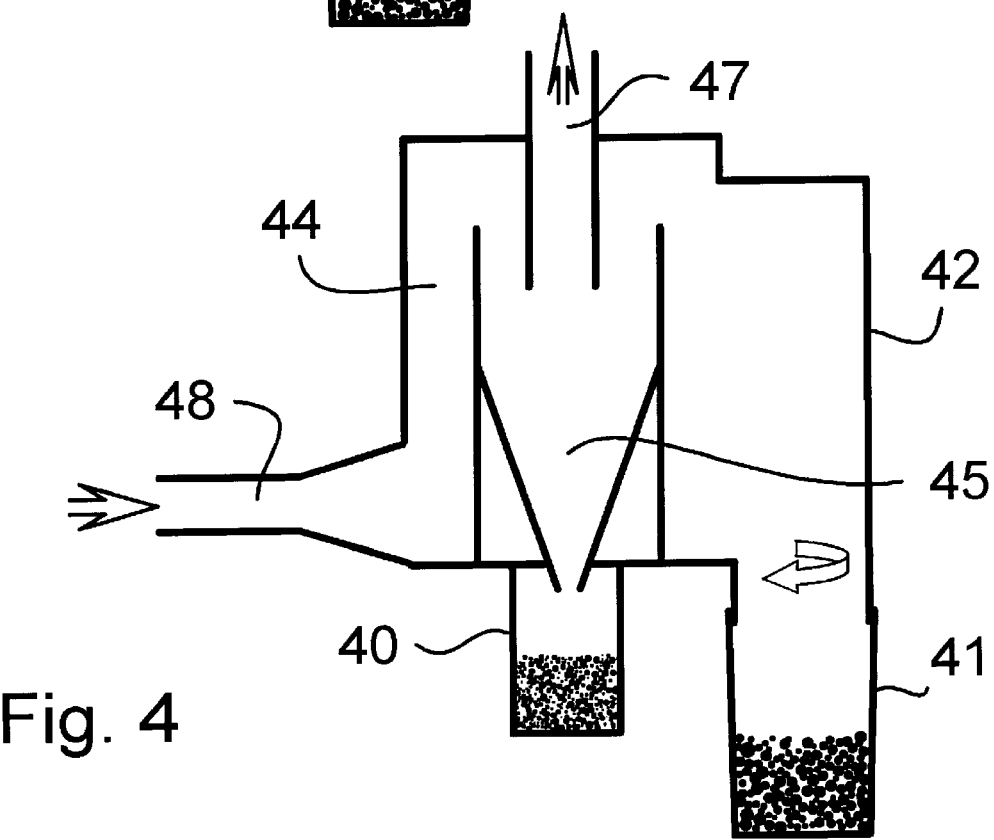
FIG. 4 is a side view of an alternative embodiment to that shown in FIG. 3.

The arrangements illustrated in FIGS. 3 and 4 have the cyclone separator 35/45 mounted within the cylindrical portion 34/44. In FIG. 3, the inlet 38 is at the upper end of the apparatus, the cyclone separator 35 is arranged for upward flow and the helical flow in the cylindrical portion 34 is downwards, exhaust air passing through outlet 37, whereas in FIG. 4 the inlet 48 is at the lower end of the apparatus, the helical flow in the cylindrical portion 44 is upwards, the cyclone separator 45 is arranged for downward flow and the exhaust air passes through outlet 47. Collection vessels for lighter particulates are identified by reference numerals 30/40 and for heavier particulates by reference numerals 31/41; secondary chambers are identified by reference numerals 32/42.

FIG. 5 illustrates an alternative arrangement in which the primary separation chamber 51 and associated cyclone 52 are arranged within a larger chamber 53. The respective chambers are each configured to have associated collection vessels 54, 55 for lighter (54) and heavier (55) particulates, respectively.

In FIG. 6, the larger chamber constitutes the secondary chamber and the vortex therein is in the same direction as the primary vortex, as shown by the dashed arrow. The wall of the primary chamber immediately upstream of the interconnection aperture is deformed tangentially at 61 into the secondary chamber to allow the vortex therein to be generated with minimum turbulence. In FIG. 7, the secondary chamber 71 is formed wholly within the larger chamber and the vortex therein is in the opposite rotational direction to the primary vortex.

Figure 8:
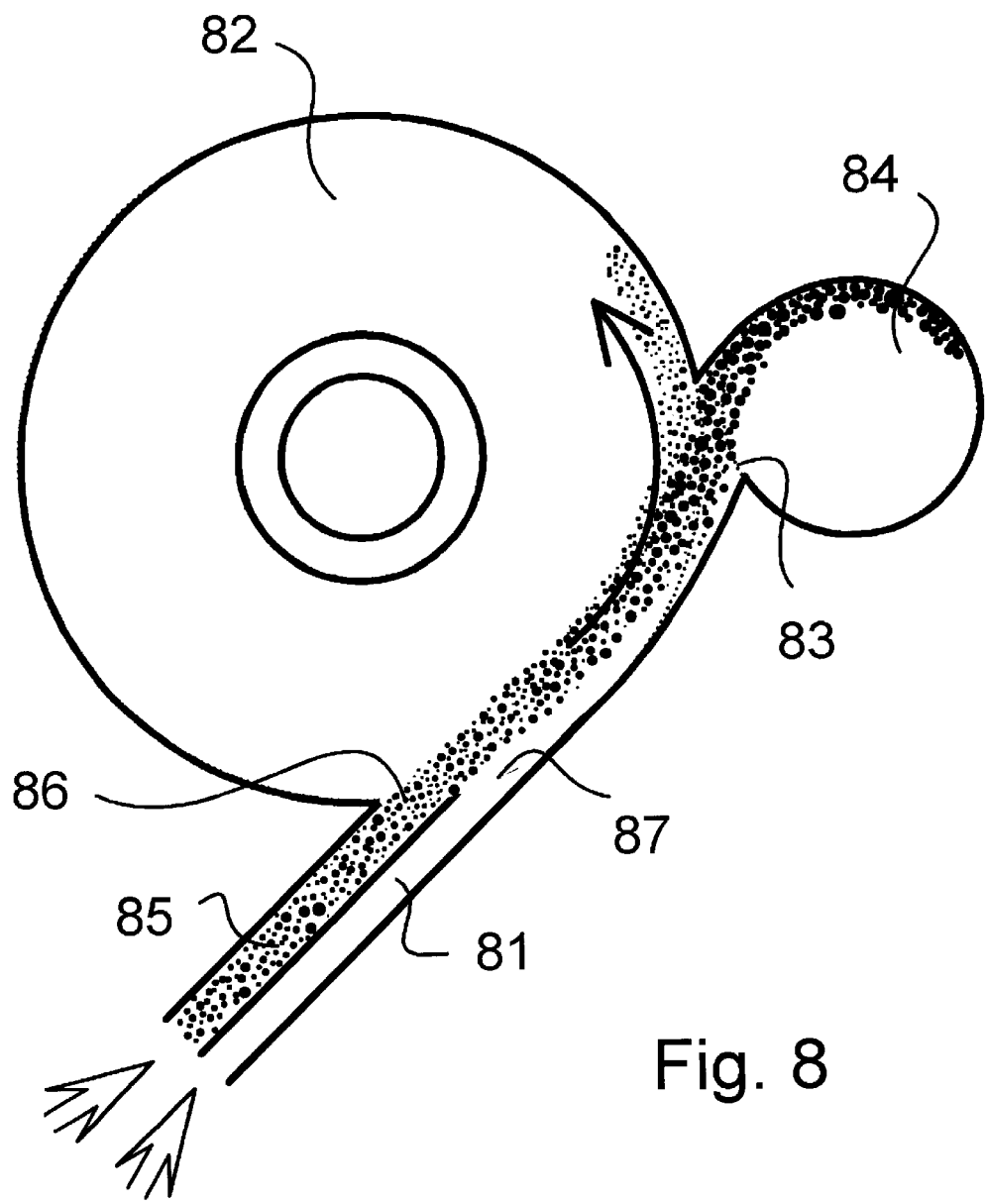
FIG. 8 shows in plan view the use of a secondary air inlet to enhance the separation of larger particulates from the airstream.

FIG. 8 illustrates a secondary air inlet through pipe or channel 81 to provide a laminar film of clean air at the wall of the primary chamber 82 and continuing to the interconnection neck 83 linking the primary chamber with the secondary chamber 84, to maintain the lighter particulates in the primary chamber while not impeding passage of heavier particulates through the neck. The secondary airstream can be supplied from a pump or may be drawn in by the dirt-laden airstream in channel 85 passing through orifice 86 and across the orifice 87 of pipe 81. The secondary airstream flowrate may be restricted by means of adjustment of orifice sizes, to provide selective separation of material entering the apparatus. The orifices 86 and 87 may optionally be circumferentially spaced apart, as an alternative to the arrangement illustrated.

Figure 9:
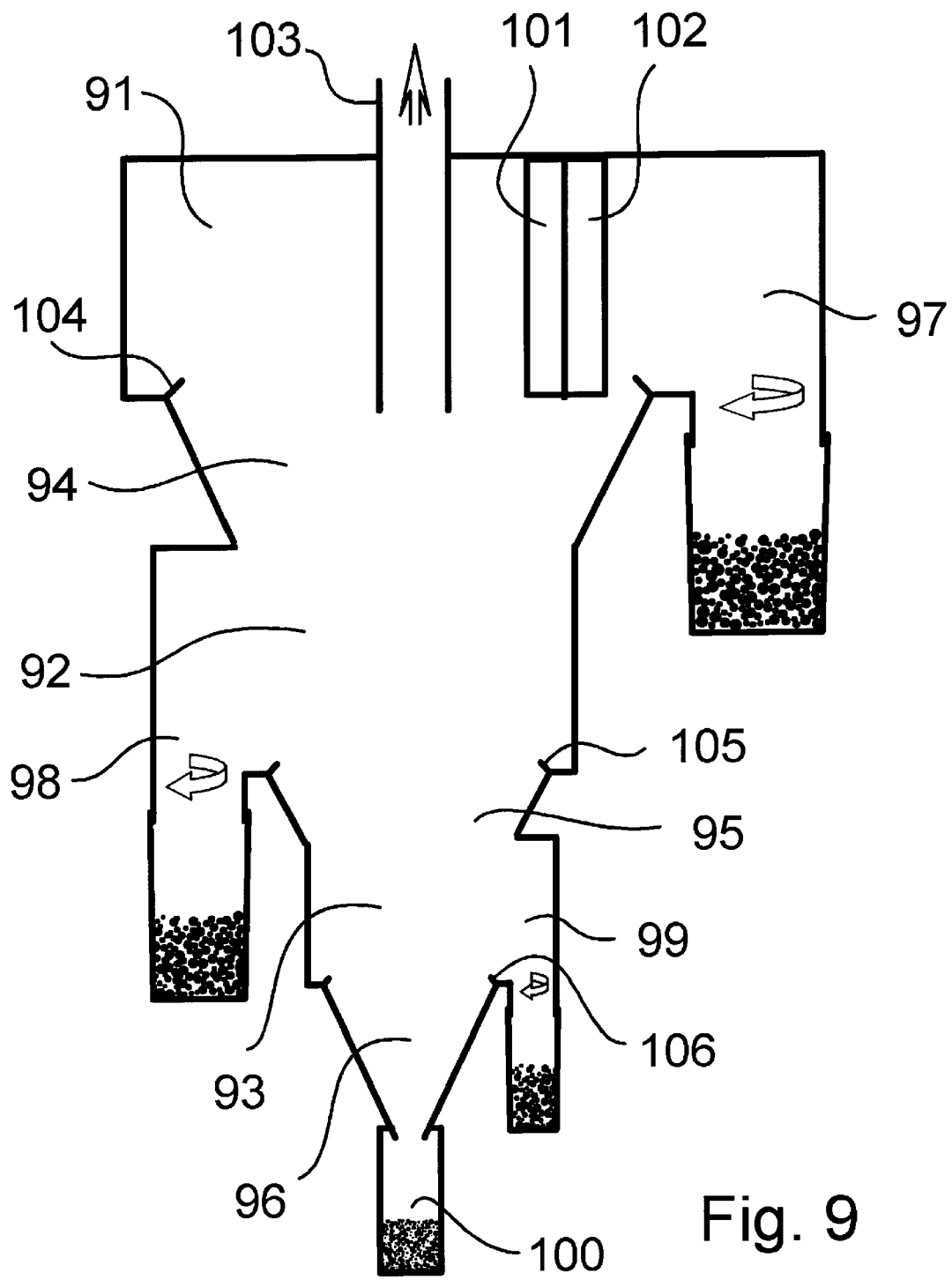
FIG. 9 shows in side view an embodiment in which the primary chamber has multiple cylindrical portions and cyclone portions.

FIG. 9 shows multiple primary chambers 91, 92, 93 axially spaced apart and connected by respective cyclones 94, 95, 96, each chamber having an associated respective secondary chamber 97, 98, 99 and cyclone 96 terminating in collection chamber 100. Shown in cross-section, inlets 101 for dirt-laden air and 102 for secondary clean air are provided in primary chamber 91 and exhaust air passes out through duct 103. Further inlets for secondary clean air may optionally be provided for each of primary chambers 92 and/or 93. Internal annular upturned flanges 104, 105, 106 are provided to enhance passage of heavier particulates into the respective secondary chamber. In operation, the larger or more dense particulates are separated from primary chamber 91 and collected by secondary chamber 97 and material not separated is concentrated in cyclone 94 before entering primary chamber 92 of smaller diameter than primary chamber 91 but otherwise similar. Centripetal forces are greater in chamber 92, whereby the larger particulates therein are separated by secondary chamber 98 and unseparated material passes to primary chamber 93 through cyclone 95 until, ultimately, the lightest particles are separated in cyclone 96 and collected in collection chamber 100.

In all embodiments illustrated, clean exhaust air passes by reverse flow through the center of the apparatus, and there is no net flow of fluid through the secondary chamber or chambers.

The present invention establishes a significant advance over previously known cleaning devices and methods for cleaning a fluid stream, and the advance is achieved with reduced cost, simplicity of fabrication, and ease of use.

Numerous modifications and variations of the preferred embodiments disclosed herein will be apparent to those skilled in the art. Accordingly, even though only few variations of the present invention are described herein, it is to be understood that the practice of additional modifications and variations and the equivalents thereof, are within the spirit and scope of the invention as defined in the following claims.

We claim:

1. Apparatus for separating particulate matter from a fluid stream, the apparatus comprising:
 a housing including intake means for intake of particulates-containing fluid;
 a separation zone in the housing that includes primary and secondary separation chambers each associated with respective particulates collection means;
 primary vortex generating means in the housing configured to generate a primary vortex in the intake fluid;
 interconnection means formed in the housing and adapted to generate a secondary vortex in the secondary-separation chamber, the interconnection means forming a demarcation region, whereby particulates entrained in the intake fluid are urged through the interconnection means under the influence of centripetal force with no net flow of fluid through the secondary separation chamber; and
 exhaust means for exhaust of cleaned fluid.

2. Apparatus according to claim 1, wherein the primary chamber and secondary chamber are peripherally interconnected.

3. Apparatus according to claim 1 wherein the primary chamber includes a cyclone portion and one of a parallel-sided portion and a cylindrical portion.

4. Apparatus according to claim 2 wherein the primary chamber includes a cyclone portion and one of a parallel-sided portion and a cylindrical portion.

5. Apparatus according, to claim 1 wherein the primary chamber includes deflection means disposed internally of the primary chamber.

6. Apparatus according to claim 3 further including an inwardly-extending annular flange between the cylindrical and cyclone portions and configured to improve discrimination between heavier and lighter particulates.

7. Apparatus according to claim 2 wherein the interconnection means further includes current-deflecting elements in the region of the interconnection between the chambers that are adapted to generate a secondary vortex in the secondary chamber.

8. Apparatus according to claim 7 wherein the current-deflecting elements establish a zone of spatial separation between the respective vortices.

9. Apparatus according to claim 7 wherein the current-deflecting elements comprise a chamber wall portion on at least one side of the intercommunication aperture that is deformed to increase its radius of curvature towards a tangential position.

10. Apparatus according to claim 1 wherein the primary separation chamber contains a cyclone separator wherein the outer wall of the primary chamber and the wall of the cyclone separator define an annular chamber in peripheral communication with the secondary chamber.

11. Apparatus according to claim 1, further including means for introduction of an auxiliary fluid stream that injects a laminar layer of dirt-free fluid at the periphery of the primary chamber.

12. Apparatus according to claim 1, wherein the primary separation chamber further includes at least two cylindrical portions each with an associated secondary separation chamber having adjacent cylindrical portions being axially connected together by cyclone portions of progressively smaller diameter in the downstream direction.

13. Apparatus according to claim 1, wherein the primary and secondary vortex generating means are configured to generate respective primary and secondary vortices having substantially different vortical directions.

14. Apparatus according to claim 1, wherein the primary and secondary vortex generating means are configured to generate respective primary and secondary vortices having substantially similar vortical directions.

15. Apparatus for separating particulate matter from a fluid stream, the apparatus comprising:
 a housing including intake means for intake of particulates-containing fluid wherein the intake means includes an adjustable orifice for varying the flow rate of the fluid;
 a separation zone in the housing that includes primary and secondary separation chambers each associated with respective particulates collection means;
 primary vortex generating means in the housing configured to generate a primary vortex in the intake fluid; and
 interconnection means formed in the housing and adapted to generate a secondary vortex in the secondary separation chamber, the interconnection means forming a demarcation region, whereby particulates entrained in the intake fluid are urged through the interconnection means under the influence of centripetal force with no net flow of fluid through the secondary separation chamber.

16. Apparatus for separating particulate matter from a fluid stream, the apparatus comprising:

a housing including at least two intake means for intake of fluid wherein the at least two intake means include an adjustable orifice for varying the flow rate of the fluid and wherein at least one intake means is configured to intake particulates-containing fluid;

a separation zone in the housing that includes primary and secondary separation chambers each associated with respective particulates collection means;

primary vortex generating means in the housing configured to generate a primary vortex in the intake fluid; and interconnection means formed in the housing and adapted to generate a secondary vortex in the secondary separation chamber, the interconnection means forming a demarcation region, whereby particulates entrained in the intake fluid are urged through the interconnection means under the influence of centripetal force with no net flow of fluid through the secondary separation chamber.

17. Apparatus for separating particulate matter from a fluid stream, the apparatus comprising:

a housing including at least one intake means for intake of particulates-containing fluid;

a separation zone in the housing that includes at least primary and secondary separation chambers each associated with respective particulates collection means;

primary vortex generating means in the housing configured to generate a primary vortex in the intake fluid; and interconnection means formed in the housing and adapted to generate at least two respective secondary and tertiary vortices in at least two respective secondary and tertiary separation chambers, the interconnection means forming a demarcation regions whereby particulates entrained in the intake fluid are urged through the interconnection means under the influence of centripetal force with no net flow of fluid through the secondary separation chamber.

18. Apparatus for separating particulate matter from a fluid stream, the apparatus comprising:

a housing including adjustable flow rate intake means for intake of particulates-containing fluid;

a separation zone in the housing that includes primary and secondary separation chambers each associated with respective particulates collection means;

primary vortex generating means in the housing configured to generate a primary vortex in the intake fluid; and interconnection means formed in the housing and adapted to generate a secondary vortex in the secondary separation chamber and wherein the interconnection means is formed with a at least two portions each having a varying radius of curvature configured to establish a demarcation region, to minimize turbulence between the primary and secondary vortices, whereby particulates entrained in the intake fluid are urged through the interconnection means under the influence of centripetal force with no net flow of fluid through the secondary separation chamber.

19. A method for separating particulate matter from a fluid stream, the method comprising the steps of:

passing particulates-containing fluid in a vortical pathway to a primary separation chamber; and permitting the vortical fluid stream to be divided between said primary chamber and a secondary separation chamber interconnected thereto and configured to generate a secondary vortical pathway in the secondary chamber, whereby heavier particulates are passed to the secondary chamber and separated from the secondary vortical fluid stream while lighter particulates are retained in the primary chamber and separated from the primary vortical fluid stream, and wherein the interconnection of the chambers is formed with a demarcation region operative to minimize turbulence between the vortical fluid streams, whereby particulates entrained in the intake fluid are urged through the interconnection means under the influence of centripetal force with no net flow of fluid through the secondary separation chamber.

20. Apparatus for separating particulate matter from a fluid stream, the apparatus comprising:

a housing including intake means for intake of particulates-containing fluid;

a separation zone in the housing that includes primary and secondary separation chambers each associated with respective particulates collections means, the primary chamber further including a separating flange;

primary vortex generating means in the housing configured to generate a primary vortex in the intake fluid;

interconnection means formed in the housing and adapted to generate a secondary vortex in the secondary separation chamber, the interconnection means forming a demarcation region, whereby particulates entrained in the intake fluid are urged through the interconnection means under the influence of centripetal force with no net flow of fluid through the secondary separation chamber; and exhaust means for exhaust of cleaned fluid.

* * * * *